L. N. BOELIO.
TREATING HAMS TO PREVENT SOURING.
APPLICATION FILED AUG. 18, 1917.
1,271,501.
Patented July 2, 1918.
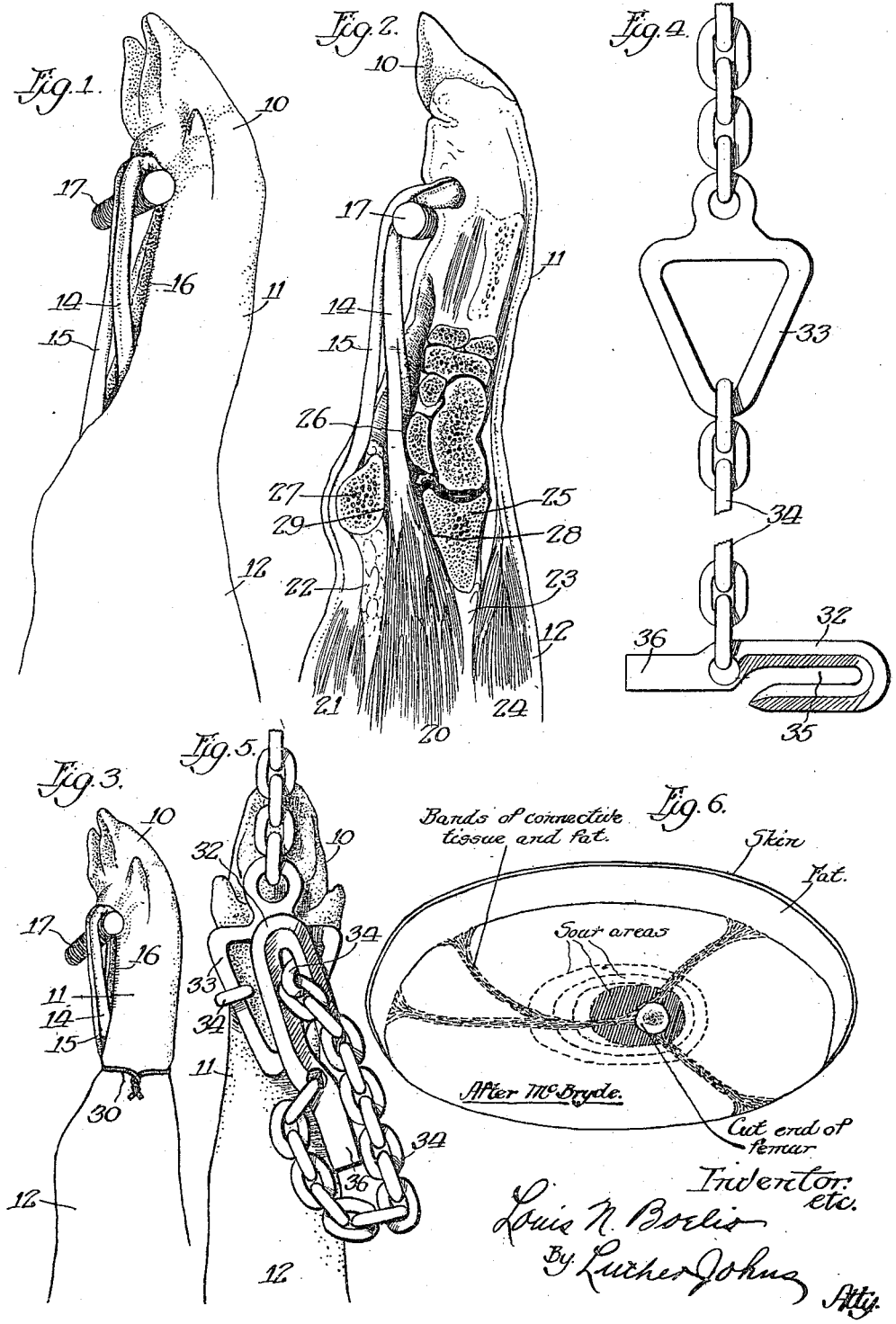

UNITED STATES PATENT OFFICE.

LOUIS N. BOELIO, OF CHICAGO, ILLINOIS, ASSIGNOR OF ONE-HALF TO LUTHER JOHNS, OF OAK PARK, ILLINOIS.

TREATING HAMS TO PREVENT SOURING.

1,271,501.     Specification of Letters Patent.     Patented July 2, 1918.

Application filed August 18, 1917. Serial No. 186,854.

*To all whom it may concern:*

Be it known that I, LOUIS N. BOELIO, a citizen of the United States, and a resident of the city of Chicago, in the county of Cook and State of Illinois, have made a certain new and useful Invention or Discovery in the Art of Treating Hams to Prevent Souring, of which the following is a specification.

My invention or discovery relates to the preservation of hams, and has for its object the increase of the proportion of hams available as food, and the avoidance of the great loss in the meat packing industry and to the government due to the appearance of large numbers of putrid hams in the packing plants. This loss to the industry has been estimated as amounting to more than a quarter of a million dollars annually, and in addition thereto the expense to the Government of maintaining trained meat inspectors to examine all hams in the packing plants and see that proper disposal is made of the "sours" is very great.

On page 10 of Bulletin 132 of the U. S. Department of Agriculture, Bureau of Animal Industry, March 17, 1911, entitled "*A Bacteriological Study of Ham Souring*" Dr. C. N. McBryde, the author, gives this definition of souring:

"To the meat inspector, a sour ham is one which has a tainted or 'off' odor, that is, any odor which deviates from the normal. The odor may be very slight, so slight that at times only the trained meat inspector can detect it. When slight, the odor is elusive and hard to define, but when pronounced it has a distinctly putrefactive quality. When not very pronounced, the odor possesses, as a rule, a slightly sour quality, chemically speaking, and at times this sour quality may be quite marked; hence the term 'sour ham,' or 'sour' has originated. In a badly soured ham—using the term 'sour' in the packinghouse sense to denote any ham that is tainted—the odor loses this sour quality and becomes distinctly putrefactive in nature.

"Sour hams are classed as 'shank sours' and 'body sours,' according to the location of the souring, and these may be 'light' or 'heavy.' When the souring is very pronounced, the ham is termed a 'stinker.'"

The bulletin referred to contains probably the most complete as well as the latest discussion of this important subject. Another reference will be found in "*The Lancet*," vol. 174, London, June 27, 1908, in which Mr. F. Klein describes a change in hams which he was certain to be the result of bacteriological growth. The article is entitled "On the nature and causes of taint in miscured hams." He makes no attempt to explain the source of entry of the putrefactive organisms into the ham.

A great many theories have been advanced to account for the presence of these organisms in the ham. One theory has been that the bacillus is present in the flesh of the hogs at the time of slaughter, a theory which was found to be untenable after elaborate experimentation. A second theory has been that the bacillus gains entrance through the pickling fluids. The presence of sour hams which have been dry-cured as distinguished from picking disproves this theory. A third theory has been that entrance is made through the handling or manipulation which the hams undergo in preparation for or during the process of curing, such as the use of ham thermomenters and billhooks. This theory is negatived by the presence of sour areas in locations where neither the billhooks nor the thermometers are applied. It has also been thought that infection may be carried from one ham to another by the needles used for injecting the ham with the fluid preservative; but the presence of the evil in dry-cured hams negatives this supposition also. In spite of all hitherto efforts to locate the source of the infection and to overcome its ravages the trouble is unabated in the industry and the whole question is regarded in the art as shrouded in mystery.

The more common methods or practices in preparing hams in the larger and best regulated packing houses, and which methods and practices have been found to be most satisfactory in view of the known state of the art, are substantially as follows:

After the hog is "stuck" and allowed to "bleed out" properly, it is dropped into the "scalding vat." As soon as the hair removes readily, it is taken from the vat in the following manner. An incision is made about three to six inches in length on the posterior surface of the hind leg, between the hock and fetlock joints. The deep digital flexor tendons and the superficial digital flexor tendons, or what are commonly known as the "ham-strings" are thus exposed. A metal hook of about one-half inch in diameter is then inserted under these tendons or "ham-strings" and attached to a moving conveyer which carries the carcass through the dehairing machine, while being supported by the one hind leg having the incision. As it leaves the dehairing machine it is placed upon a moving table. Here the hook is withdrawn and the remaining hair is scraped away by hand. An incision similar to the one already described is then made in the other hind leg. Either wooden or metal gambrels are next inserted under the exposed tendons of both hind legs. The carcass, supported by both legs, then passes along an over-head track to a place where removal of the viscera and washing take place. The dressed carcass is then allowed to hang on what is known as the "hanging floor", for a period of from four to eight hours, the object being that it may lose most of its body heat before being put into the "chill room," thus saving refrigeration. It is then put into the "chill room" and cooled, either rapidly or slowly according to the method preferred, to a temperature a little above freezing. This requires from twelve to twenty-four hours or longer. The carcass is then sent to the "cutting floor," where it is divided into its various commercial parts. The hams, in which we are most interested, are then sent either to the "spreading floor" where they receive an additional cooling and then to the "pickle cellar," or they are sent direct to the "pickle cellar" from the "cutting floor" or "cutting room." Here they are "pumped" and "pickled" in the particular way adopted by the particular plant. The exact routine of "pumping", "pickling," "over-hauling," as well as the strengths and kinds of solutions, and the proportions used, as also the time and temperature involved are variables, according to the method which is supposed to give the best results in the particular plant.

As to the universality and character of these putrefactive organisms I refer to what is perhaps the most extensive work on the subject, which is that by Leo. F. Rettger. His first paper, "Studies on putrefaction" was published in *The Journal of Biological Chemistry*, 1906–1907, vol. 2, page 71. Rettger's second paper, "Further studies on putrefaction" was also published in *The Journal of Biological Chemistry*, 1908, vol. 4, page 45. In this work it was plainly demonstrated that certain anaerobic organisms were capable of producing typical putrefactive changes. These anaerobic putrefying organisms were isolated from fecal material. In the method of procedure this material was heated to 80 degrees C. or 176 degrees F. for ten minutes. The reason for this was to kill other organisms than the anaerobes present in the material. The treatment of this material in this manner demonstrates the very high thermal death-point of these organisms. After this treatment Rettger was able to isolate living anaerobic organisms which were able to produce typical putrefaction, *i. e.* organisms which were capable of breaking up complex nitrogenous compounds into their simpler component parts. Muscular tissue is a good example of a complex nitrogenous compound.

In Rettger's first paper herein mentioned he makes the following statement: "The initial decomposition is caused by anaerobes which appear to be everywhere present." He also says: "If a tube of medium be inoculated with a single grain of garden soil, dirt from the street, scrapings from old harness, etc., it will invariably undergo putrefaction under anaerobic conditions." Also: "The commonest, or at least the best known of these anaerobes are the *Bacillus putrificous* of Bienstock (*B. cadaveris* of Klein), the bacillus of malignant edema and the bacillus of symptomatic anthrax." The *Bacillus putrificus* was discovered by Bienstock, who also found it in great abundance in ordinary street dirt. It is described as a long slender organism, which grows very rapidly under strictly anaerobic conditions. It is also actively motile. The actively vegetating forms produce spores, as a rule in three or four days, at a temperature of 37 degrees C. The spores are large and terminal and have the characteristic drumstick appearance. The motility of the organisms persists long after the spores are produced.

The work which has already been done and the results of which have been published reveal the enormous numbers and wide distribution of these putrefactive organisms. In view of these facts one could not choose a more favorable locality than that of a packing industry to encounter these forms in the greatest abundance.

Having shown the state and conditions of the art I may now set forth that the important discovery on which my method for the prevention of sour hams is based is that the putrefactive organisms which give rise to both the shank and body sours enter the ham through the incisions made in dissecting out the tendons for supporting the animal, first those of one leg and then the other, as hereinabove pointed out. This discovery has been the result of a very careful examination into all the conditions through which the hog and ham pass. I have found that from the scalding vat to the pickling vat the incision in the leg of the ham is subjected at substantially every stage to water, particles of skin, hair, dirt, etc., containing large numbers of the organisms in question. The water of the scalding vat is never sterile and usually is dirty to an extreme, and its temperature is seldom if ever high enough to kill the spores in question. In many instances this filthy scalding vat water enters and fills the incision of the leg. In some cases the hog is so handled by the man who makes the incision that the incised leg is not completely submerged and infection may thus be avoided in some cases at the scalding vat. During the dehairing operation, which is by a machine, particles of skin, hair and dirt are thrown about and into the incised portion of the leg, and the entrance of such infectious matter is facilitated by the presence of water at a relatively low temperature playing upon the carcass. Afterward the carcass is further washed by non-sterile water.

By the process of dissection I have found that the weight of the hog carried by the tendons causes ruptures of the various connective tissue about the tendons and muscles extending from about the place where the incision is made downward into the body of the ham. I have thus found that in many instances there are clear and distinct passage-ways, in some instances better defined than in others, from the opening at the incision referred to down past the tendons and muscles and directly into the shank and body of the ham, and I have found that after the hog has been passed through the dehairing machine these passage-ways are filled with water containing the putrefactive organisms and their spores. In some instances the ruptures of the tissue do not seem to be as great as in other instances and may not be sufficient to admit water into the interior of the ham. The presence of such water may be demonstrated by pressing one's two thumbs against the shank below the exposed tendons and, while continuing the pressure, moving the thumbs upward, whereupon a considerable quantity of water will be forced out of the various cavities and recesses of the shank and leg. This may be done after the slaughtering process has been completed for some hours. In time, however, such water sinks lower and lower into the ham and disappears, and with it the germs of putrefaction.

It needs hardly to be stated that these organisms, whether in the vegetating or spore state find in the freshly slaughtered animal the most advantageous conditions for their development and growth. These micro-organisms grow more favorably under ordinary temperatures, and it is but a short while before the flesh of the animal has reached the temperature most favorable to their growth. They also find their way, as pointed out, into regions where strictly anaerobic conditions exist. The multiplication of the germs proceeds very rapidly and before the infected ham reaches the pickling vat it is literally infested with the organisms in an active state.

If the condition of the tissues as to ruptures is such that these forms find access only to the shank portion of the ham the infection will be largely confined to the shank within the time the ham is in the pickling vat. In time it would, of course, extend throughout the entire ham. If, on the other hand the ruptures are such as to admit the infection more deeply, and especially if avenues for travel be opened along the femur, the infection will extend very rapidly to the interior of the ham. Thus we have shank sours or shank-and-body sours from this common cause, dependent upon the nature of the passage-ways open for the entrance of the infectious material, and dependent upon the actual presence of infectious material in the particular ham.

In the accompanying drawings, which form a part of this specification, Figure 1 is substantially a side view of the foot, leg and shank portion of a ham suspended by the tendons in the usual way;

Fig. 2 is a mesial, sagital section through the parts shown in Fig. 1, the structures being slightly turned on the vertical axis;

Fig. 3 is a smaller view similar to that of Fig. 1, showing the application of a constricting element;

Fig. 4 is a fragmentary view of a new form of shackling device for suspending the animal;

Fig. 5 shows the application of the device of Fig. 4 to a hog's foot; and

Fig. 6 is a cross section through the body of a ham with sour areas indicated by shading and dotted lines, the same following the drawing on page 11 of the Government Bulletin No. 132 hereinabove mentioned.

The illustrated portions of the animal are the foot 10 the leg 11 and the shank 12. The body of the ham is shown sectionally in Fig. 6. In Figs. 1, 2 and 3 the flexor tendons 14 and 15 are exposed through the incision 16 and the hog is supported in the usual way on the gambrel 17. The tendons 14 and 15 terminate in the muscles 20 and 21 respectively. Between the muscles 20 and 21 there appears a mass of fat and connective tissue 22 and a similar mass of tissue and fat 23 occurs between the muscles 20 and 24. Ordinarily the several muscles are bound together by bands of connective tissue which would constitute an obstruction to the entrance of water to the interior of the ham. Ordinarily, too, the tendon 14 would be in very close association with the lower end of the tibia, shown sectionally at 25, as well as with the bones 26 and 27; but under the conditions of suspension upon the gambrel 17 the muscles 20 and 21 are drawn upward, the several bones separated, the connective tissue ruptured, and distinct passageways opened between the muscle 20 and the tibia 25, as at 28, as well as at 29, and into the masses of connective tissue and fat 23 and 22. I find also that the dislocation of the tarsal bones admits of the passage of water between them where they ordinarily rub upon each other, and thus quantities of water are found throughout various spaces in the leg portion 11 and the shank portion 12.

The working downward of the water is facilitated, if not in many cases caused, by the fact that while the hog is being handled when suspended by a hook, just as it leaves the scalding vat and while passing through the dehairing machine, or when suspended upon the gambrel during the later operations, the muscles and tendons are in more or less motion relative to each other and to adjacent parts, due to the swinging and twisting of the animal, to interrupted strains and to the occasional relaxation of parts previously under strain, as when the hog is rested upon a table while the second leg is incised. The infectious water is thus given abundant opportunity for working among the bones and tissues, and downward into the body of the ham.

My preferred method for overcoming the objectionable condition comprises supporting the hog carcass at all stages of the slaughtering, dressing and cutting up of the same into the various commercial parts whereby the shank of the ham is maintained free from a passageway adapted to admit the putrefactive organisms or their spores from the exterior to the interior of the ham, after which the curing may be done in any approved way, such as by pickling. In another view it comprises the exclusion of such organisms or their spores from the interior of the ham during the preliminary operations, followed by curing. In another aspect it includes so treating the ham during the slaughtering, dressing and cutting up whereby putrefactive organisms or their spores in active form or in latent form likely to become active are excluded from the interior of the ham during such operations, followed by the curing of the ham in any approved way.

In practice my invention or discovery may be followed by using a shackle which does not so mutilate the leg portion of the animal as to admit the destructive organisms to the interior thereof, as, for instance, by the use of the shackle shown in Figs. 4 and 5. It may also be practised by making an incision, as 16, in the usual way and excluding putrefactive organisms in any of several ways, as, for instance, by means of a clamping or constricting device, as a wire 30 passed about the leg of the animal at about the place where the tendons emerge from the incision, and twisting the ends of the wire together whereby the interior parts of the animal at that place are so bound together and upon each other as to prevent the objectionable germ-containing water from gaining entrance beyond the constricted portion. In another manner of operation after incising the leg a suitable substance of a chemical nature may be forced into the leg portion where the passageways mentioned occur, which substance has the property of rendering the putrefactive organisms incapable of becoming active, or if active inhibiting their activity whereby should they find access to the interior of the ham they will be incapable of injurious results. Such a substance may be common salt or saltpeter in finely divided form which may be packed and forced into the wound whereby when water containing the germs enters at the same place the germs will find themselves in a strong brine which will be their accompaniment to and into the ham. Other substances approved by the Government as to non-deleterious properties may be used. Suitable injections of such or other solutions may also be made in the leg and shank portions as by the ordinary pumping needle, preferably inserted through the incision and following the tendons and muscles, thus sufficiently filling and surrounding the tissues to meet the exigency when infectious water may work downward in the way hereinabove described.

I am aware that shackles and gambrels have heretofore been suggested for suspending a hog by the legs without making the usual incision to expose the tendons. Such suggestions heretofore have been either to provide convenience in handling the animal, or to avoid injuring the leg. Where the hind leg is cut, as by dissecting out the tendons, the leg is appreciably spoiled for pickling that member, as in making what are known as "pickled pigs feet." My present invention or discovery is not concerned primarily with the commercial value of the legs of the animals, but only with the hams. Before the pickling or other curing process is begun the legs are removed and become a separate and distinct commercial article. Incidentally the value of the legs would be somewhat increased by the use of the shackle shown in Figs. 4 and 5, but this feature is merely incidental.

In using the shackle of the drawings the hook 32 may be passed through the ring 33 with the chain 34 around the leg of the hog, and the chain 34 then drawn tight. There is sufficient length of chain 34 to permit the hook 32 to be manipulated freely, as seen in Fig. 5. The slot-like opening 35 is just wide enough readily to admit one of the links 34 flatwise. When the chain is drawn tightly around the leg, the hook 32 is made to engage the link 34 just outside the ring 33, whereupon the adjacent crosswise link becomes locked against the hook 32 and the hook itself impinges the ring 33, thus holding the hog securely. A blow upon the end 36 of the hook forces it out of engagement with the chain and the leg of the hog is released.

Other features of practice than those specifically illustrated and described will readily suggest themselves to persons skilled in the art, and I contemplate all such changes and departures from what is specifically set forth as fall within the liberally construed scope of the appended claims.

I claim:

1. The method of treating hams to prevent souring which comprises supporting the hog carcass at all stages of slaughtering, dressing and cutting up of the same into various parts in such manner that the shank of the ham is maintained free from a passage-way adapted to admit putrefactive organisms or their spores from the exterior to the interior thereof, and then curing the ham in any approved way.

2. The method of treating hams to prevent souring which comprises supporting the hog carcass at all stages of slaughtering, dressing and cutting up of the same into various parts in such manner that putrefactive organisms or their spores are excluded from the interior of the body of the ham during said operations, and then curing the ham in any approved way.

3. The method of treating hams to prevent souring which includes supporting the hog carcass at all stages of slaughtering, dressing, and cutting up of the same into various parts while maintaining the shank of the ham free from a passageway adapted to admit to the interior of the ham during said operations putrefactive organisms or their spores in a form likely to produce putrefaction, and then curing the ham in any approved way.

4. The method of treating hams to prevent souring which includes slaughtering the animal, dressing the carcass, and cutting up the same into various parts, the ham being one of such parts, while excluding putrefactive organisms and their spores from the interior of the shank of the ham during said operations.

5. The method of treating hams to prevent souring which includes slaughtering the animal, dressing the carcass, and cutting up the same into various parts, the ham being one of such parts, while excluding putrefactive organisms and their spores from the interior of the body of the ham and from the interior of a portion of the shank of the ham during said operations.

6. The method of treating hams to prevent souring which includes slaughtering the animal, dressing the carcass, and cutting up the same into various parts, the ham being one of such parts, while excluding putrefactive organisms and their spores from the interior of the body of the ham during said operations.

7. The method of treating hams to prevent souring which includes slaughtering the animal, dressing the carcass, and cutting up the same into various parts, the ham being one of such parts, while preventing the growth with multiplication of putrefactive organisms and their spores in the tissues of the interior of the shank of the ham during said operations.

8. The method of treating hams to prevent souring which includes slaughtering the animal, dressing the carcass, and cutting up the same into various parts, the ham being one of such parts, while preventing the growth with multiplication of putrefactive organisms and their spores in the tissues of the interior of the body and shank of the ham during said operations.

9. The method of treating hams to prevent souring which comprises supporting the hog carcass by the exposed ham strings at all stages of dressing and cutting up of the same into various parts while maintaining, by means of a flesh-constricting device, the shank and body of the ham free from a passageway adapted to admit putrefactive organisms or their spores to the interior of the body of the ham from the incision exposing the ham strings, and then curing the ham in any approved way.

10. The method of treating hams to prevent souring which comprises supporting the hog carcass by the exposed ham strings at all stages of dressing and cutting up of the same into various parts while maintaining the shank and body of the ham free from a passageway adapted to admit putrefactive organisms or their spores, in a form likely to cause putrefaction, to the interior of the body of the ham, by introducing into the passageways extending from the incision exposing the ham strings a substance adapted to inhibit the activity of the organisms and render their spores incapable of activity to produce putrefaction, and then curing the ham in any approved way.

LOUIS N. BOELIO.

Copies of this patent may be obtained for five cents each, by addressing the "Commissioner of Patents, Washington, D. C."